United States Patent

Malfert

[11] 3,904,899
[45] Sept. 9, 1975

[54] LINEAR ASYNCHRONOUS ELECTRIC MOTORS

[75] Inventor: Alain Malfert, Morsang-sur-Orge, France

[73] Assignee: Agence Nationale de Valorisation de la Recherche (ANVAR), France

[22] Filed: Aug. 5, 1974

[21] Appl. No.: 495,096

[30] Foreign Application Priority Data
Aug. 10, 1973 France .............................. 73.29389

[52] U.S. Cl. .............. 310/12; 104/148 LM; 310/52
[51] Int. Cl.² ......................................... H02K 41/02
[58] Field of Search. 104/148 LM, 148 MS, 148 SS; 310/12, 13, 16, 52, 10, 40, 198, 163; 335/216

[56] References Cited
UNITED STATES PATENTS

| | | | |
|---|---|---|---|
| 3,589,300 | 6/1971 | Wipf | 310/13 X |
| 3,644,766 | 2/1972 | Hughes | 310/163 X |
| 3,768,417 | 10/1973 | Thornton et al. | 335/216 X |
| 3,850,109 | 11/1974 | Thornton | 104/148 SS |

*Primary Examiner*—R. N. Envall, Jr.
*Attorney, Agent, or Firm*—Larson, Taylor and Hinds

[57] ABSTRACT

The motor has a passive conductive track, comprising an inductor winding intended to be traversed by a direct current, of superconducting material, placed in a cryostat, rotary with the cryostat around an axis parallel to the plane of the track and perpendicular to the direction of relative movement of the track and of the inductor. An auxiliary polyphase winding parallel to the track and wound so as to create a sliding field, synchronous with the field of the inductor, is arranged mechanically so that relative motion between it and the axis of the inductor in translation along the track is absent. The auxiliary polyphase winding may be flat and comprise coils whose separation increases from its medium plane, in line with the axis of the inductor.

5 Claims, 3 Drawing Figures

LINEAR ASYNCHRONOUS ELECTRIC MOTORS

The present invention relates to linear asynchronous electric motors, that is to say those in which there takes place during operation a linear translatory movement between an assembly and a linear track, in the direction of the track. It relates more particularly to such motors which are asynchronous and with a passive track, this term being interpreted as signifying that the operation of the motor is not accompanied by any external electrical supply from the track or by any taking up of energy in electrical form on the latter.

Such a linear motor converts the electrical power that it receives in the form of alternating voltages and currents into mechanical power of displacement of the assembly with respect to the course constituted by a fixed track.

Linear asynchronous motors have already been proposed for driving vehicles; unfortunately, these motors have the drawback of requiring a narrow air gap which prevents giving the suspension of the vehicle a large latitude of movement. If the track is passive, choice must be made between a simple track, not including ferromagnetic material, but which imposes further limitations on the air gap, only a very short length of lines of force in the air being compatible with an acceptable reduction thereof, and a composite track, containing ferromagnetic material. However such a track is very expensive, having to be laminated and include a winding. Lastly, the cos $\phi$ is generally low. Similar problems arise in the case of electromagnetic pumps and MHD generators, of which the cos $\phi$ is particularly low due to the necessary reactive power.

It is an object of the present invention to provide an asynchronous electric motor with a passive track meeting the various exigencies of practice better than those proposed hitherto.

It is a further object of the invention to provide an asynchronous electric motor improved by having very high power per unit volume and cos $\phi$ as a result of the use of a superconducting winding which is subject only to a substantially constant magnetic field in steady operation, and is furthermore not subject to any considerable mechanical torque.

According to the invention therefore, there is provided an asynchronous linear electric motor with an electrically conducting passive track, comprising a field winding or inductor for traversal by direct current, of superconducting material, placed in a cryostat, rotary with the cryostat around an axis parallel to the plane of the track and perpendicular to the direction of relative movement of the track and of the inductor, and an auxiliary polyphase winding parallel to the track and wound so as to create a sliding or moving field, synchronous with the field of the inductor, when it is traversed by a polyphase current at suitable frequency, which winding is fast to the inductor in translation along the track.

Such a motor, permitting a large air gap, has, due to the fact of the reduced volume of the inductor for a given induction, a power per unit volume very much higher than that of conventional motors and has a very high cos $\phi$, the reactive power necessary for its operation being negligible.

The invention will be better understood on reading the description which follows of devices which constitute particular embodiments of the invention given by way of non-limiting examples.

The description refers to the accompanying drawings, in which.

Figure 1:
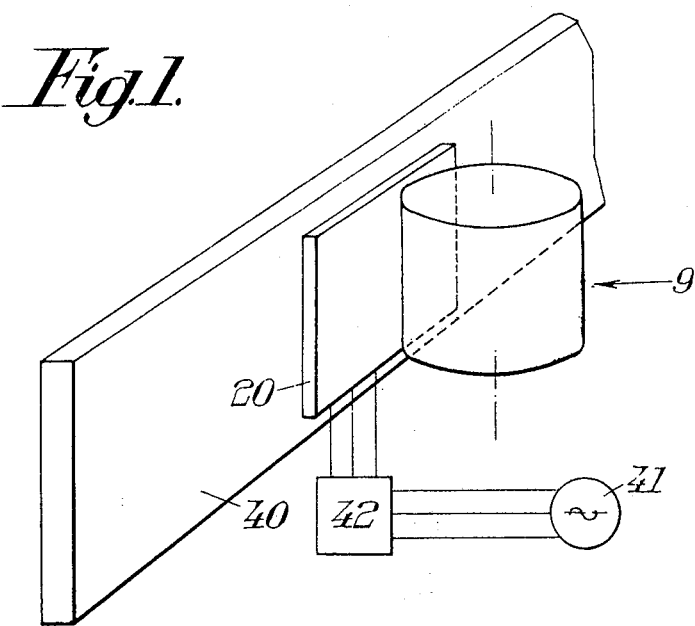
FIG. 1 is a diagram showing, in elevation, a possible relative arrangement of the track, of the inductor and of the auxiliary winding of a linear motor constituting one embodiment.
Figure 3:
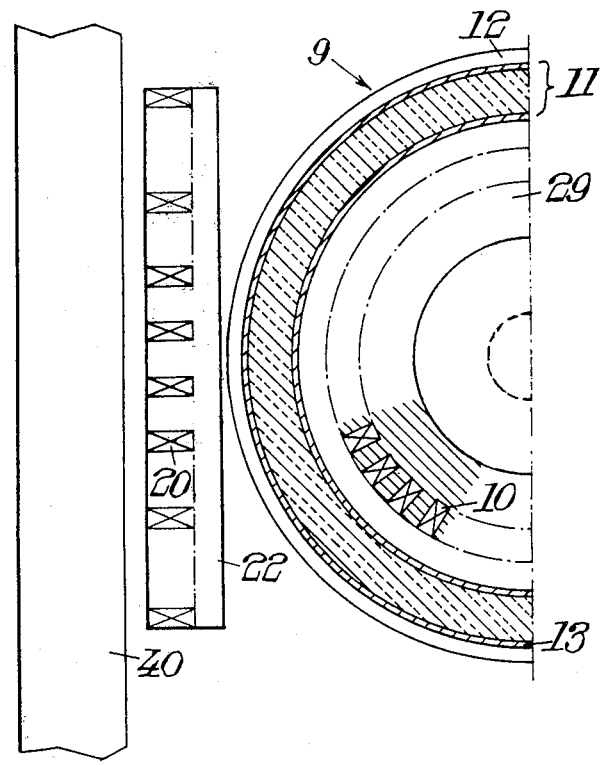
FIG. 3 is a diagrammatic view in section, along the line III—III of FIG. 2.
Figure 2:
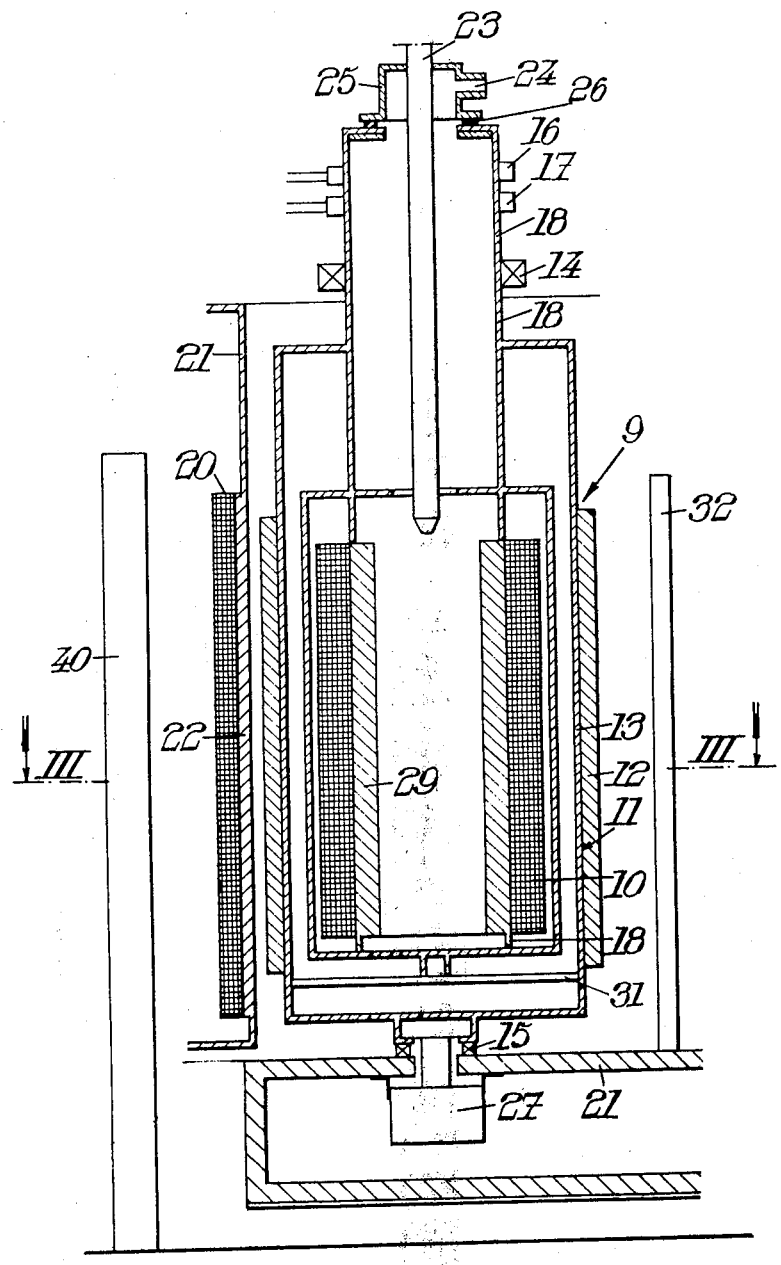
FIG. 2 is a diagrammatic view in section along a plane passing through the axis of a three-phase bipolar asynchronous motor corresponding to the diagram of FIG. 1.

The motor illustrated in FIGS. 1, 2 and 3 comprises a rotary assembly 9 of generally cylindrical shape, which comprises, arranged coaxially from the axis, a field winding or inductor 10 contained in the cryostat 11, and an electrically good conducting shield 12 fast to the outer wall 13 of the cryostat. The rotary portion, shown here with a vertical axis, could just as well be with a horizontal axis; the driving track - which here is in a vertical plane - should then be horizontal.

By way of example, it will be assumed that the inductor is with one pair of poles, but it could just as well have several thereof.

The rotary assembly is provided with a lower shaft which, in the embodiment illustrated, serves for the starting of the inductor 10, as will be seen below. The rotary assembly is borne and guided in rotation by a bearing or lower stop bearing 15 and by a bearing or upper bearing element 14 of large diameter. Both are sufficiently spaced from the inductor 10 for the magnetic flux which passes through them to remain small. These stops or bearings are fixed to the chassis 21 of the vehicle to be driven, of which chassis a fraction appears in FIG. 2.

The portion of the motor borne by the vehicle comprises also a polyphase winding 20 provided to transmit to the chassis the whole of the tractive force exerted by the motor. This winding 20 must hence be fixed very firmly to the chassis, which does not present difficulties, given that it is not of superconducting material and that in consequence it is not necessary to keep it at very low temperature. The winding 20 is placed between the inductor 10 and the fixed track. In the embodiment illustrated in FIGS. 1 to 3, it is flat, but it could equally be incurved to have a shape intermediate between that of the track and that of the inductor 10. As is shown in FIG. 3, this winding is placed in the slots of a body 22 formed advantageously of a reinforced insulating material, or of steel which may or may not be magnetic. In the case where it is of steel, it must be laminated to avoid eddy current losses. The winding 20 is of an electrically good conducting material (copper or aluminum), suitably cooled by the circulation of air or of a cooling fluid (water or oil).

The winding 20 must produce a magnetic field synchronous with the rotary bipolar magnetic field of the inductor 10. Now the winding 20, if it is flat, is swept by the rotary magnetic field of the inductor 10 at a speed which is not the same at any point by reason of the geometric arrangement; the various coils of the flat winding 20 will consequently be arranged, so that the speed of the field which it produces is at any point equal to the sweeping speed of the rotary field of the inductor. This requires that the coils should be more "aggregated" in the central portion of the polyphase flat winding, as is seen in FIG. 3. The distribution of the conductors to ensure this condition results from an obvious calculation. The winding 20 is for example three-phase, a different number of phases being obviously usable.

The portion of the motor borne by the vehicle comprises in addition a fixed electromagnetic shield 32 of an approximately semi-circular shape designed to dampen the rotary magnetic field produced by the rotation of the superconducting inductor 10. The shield 32 can be of laminated ferromagnetic material. However it is preferable, to avoid the appearance of forces tending to urge the conductor against the shield, to use a solid shield of electrically good conducting material, but not ferromagnetic. The eddy currents which are created therein by the rotation of the inductor tend to cancel the magnetic disturbances created by the rotary field outside the system.

The inductor winding 10 and the mandrel 29 are enclosed in the cryostat 11 and the mandrel 29 is fixed to the outer wall 13 of this cryostat by centering parts with high heat resistance. In the embodiment illustrated in FIG. 2, these parts include the jacket 18 which projects substantially above the cryostat, bears slip rings of the sliding contacts 16 and 17 and rotates in the bearing 14, as well as thin partitions 31.

In the embodiment illustrated in FIGS. 2 and 3, the outer wall 13 of the cryostat bears the shield 12. But this outer wall 13 can just as well be constituted by a cylinder of an electrically good conducting material (aluminum alloy for example) of sufficient thickness to constitute also the magnetic shield 12. This shield is necessary since, as has already been stated, the hysteresis observed in the magnetic behaviour of superconductors requires that the latter be protected against rapid variations in magnetic field. For this reason, superconducting alternators as have been developed up to the present all comprise also an electromagnetic shield which has the function of damping the effects of the stray magnetic fields produced by the armature.

Whatever the solution adopted to supply the inductor winding 10 during start and speed up this winding 10 advantageously includes a superconducting switch (not shown) open on the development of steady conditions and which is closed at steady conditions so as to short circuit the inductor winding and trap the flux necessary for operation. At the same time, the supply can be interrupted.

Between the inner wall and the outer wall of the cryostat there is provided a thermal insulation, which can be constituted in conventional manner by a double wall jacket under vacuum, containing a laminated material according to the so-called super-insulation technique. The shaft of the inductor and the connecting members between the winding 10 and the outer wall 13 of the cryostat must be of small cross-section, and formed for example of stainless steel of low thermal conductivity. Under steady state, no torque is exerted on the inductor, which permits connections of low mechanical strength.

The cryostat is provided with fluid supply means to maintain cryogenic temperatures. In the embodiment illustrated diagrammatically in FIG. 2, these means comprise a central pipe 23 placed in the axis of the jacket 18 and which opens inside the mandrel 29 bearing the inductor winding 10. Through this pipe, means, not shown, enable the injection of cryogenic fluid (liquid helium or better still, hypercritical helium). The vaporised helium flows back into the space comprised between the pipe 23 and the jacket 18 which is advantageously provided with an insulating covering. The gaseous helium is removed through a pipe 24 which opens into a fixed collector 25 cooperating with the terminal surface of the jacket 18 through a rotary fluid-tight seal 26.

The passive track 40 may be constituted in various ways. It may be constituted by a solid strip of electrically good conducting metal (copper or aluminum generally). It can be constituted by flat coils placed in short circuit and borne by an insulating or ferromagnetic support, although the latter constitution considerably complicates the track.

Instead of using the arrangement illustrated in FIGS. 1 to 3, in which the inductor and the auxiliary winding are placed on the same side of the track 40, it will be possible, although this solution seems less advantageous, to place the rotary assembly 9 and the auxiliary winding 20 each on one side of the track 40.

The auxiliary winding 20 must be supplied with polyphase electric current from a source 41 borne by the vehicle to be driven. An electrical analysis of the operation of the motor which has just been described shows that, for each slip and for each value of the magnetic flux produced by the inductor 10, there exists an optimal value of the supply voltage of the auxiliary winding 10 for which the heat dissipation in this winding is minimal. The supply circuit of the winding 20 hence advantageously comprises, as indicated in FIG. 1, a control system 42 which can be constituted by an autotransformer whose output voltage is regulated by a servo-loop making this voltage dependent on the slip and on the magnetic flux, measured by means of detectors, not shown, which can be of conventional type.

The operation of the motor which has just been described being apparent from the foregoing description, it will only be briefly indicated. It will appear better if it is remembered that the motor, although asynchronous, includes a rotary inductor 10, which at any moment, rotates at a speed such that it is in synchronism with the slipping field of the auxiliary winding 20, which implies starting it, before starting up of the vehicle, at a speed which corresponds to a peripheral linear speed equal to that of the slipping field.

It is possible for this, the vehicle being stationary, to start up the rotary assembly and to bring it to the speed of synchronism by means of the auxiliary motor 27 (FIG. 2) supplied by a source carried on board the vehicle. This starting up is effected, the winding 20 and the inductor 10 not being supplied; the synchronism is noted by comparison between the frequency (assumed fixed in this mode of starting up) supplied by the supply generator 41, and the frequency of rotation of the inductor. In this case, once the inductor 10 has been brought to the speed of synchronism, it suffices to supply simultaneously the inductor 20 with current and the winding 20 with voltage (servocoupled as previously to the current in the inductor 10) to cause the starting up and the rise in speed of the vehicle with a slip which passes gradually from a value of 100% to the value of normal operating conditions. In the course of this rise in speed, the system 42 intervenes obviously to adjust at any time the supply voltage to a suitable speed.

During the initial phase of the rise in speed, the inductor 10 must be supplied by a current source, not shown, through sliding contacts 16, 17, with later short-circuiting by the superconducting switch, not shown.

The vehicle could also be made to start up without using an auxiliary starting motor 27, on condition that there is provided a supply source for the winding 20 at variable frequency: this will be the case for example for a vehicle supplied with direct current through brush members on paths provided along the track (brushes or pantograph), the vehicle including a current converting system. In this case it suffices to supply the winding 20 at an increasing frequency from a very low value to cause at the same time the starting up of the vehicle and the bringing into synchronism of the inductor previously supplied with current which follows the increase in speed of the slipping field.

Another solution again consists of starting up the inductor up to a speed close to synchronism by using the conducting shield 12 as a squirrel-cage rotor of an asynchronous motor.

I claim:

1. Linear asynchronous electric motor for use with a passive conductive track, comprising: a superconducting inductor winding adapted to be traversed by direct current, located in a cryostat and adapted to be mounted on a vehicle for rotation with the cryostat about an axis parallel to the plane of the track and perpendicular to the direction of relative movement of the vehicle with respect to the track; an auxiliary polyphase winding parallel to the track; and means for circulating in said auxiliary winding polyphase AC currents of such frequency as to create a moving field, synchronous with the field of the inductor, which winding is connected to the vehicle against relative motion parallel to the track between said auxiliary winding and the axis of the inductor.

2. Motor according to claim 1, wherein the auxiliary polyphase winding is flat and comprises a plurality of coils, the distance between said coils increasing from the midplane of said winding to the end portions thereof.

3. Motor according to claim 1, wherein the rotary inductor and the auxiliary winding are placed on the same side of the track.

4. Machine according to claim 1, wherein the means for supplying the auxiliary winding comprise an electrical circuit for circulating in said auxiliary winding currents which are in relation with the value of the magnetic flux provided by the inductor.

5. Machine according to claim 4, having means for starting up the inductor up to the frequency of synchronism with the moving field of the auxiliary winding.

* * * * *